No. 838,287. PATENTED DEC. 11, 1906.
W. V. TURNER.
GRADUATED RELEASE VALVE.
APPLICATION FILED APR. 1, 1904.
3 SHEETS—SHEET 1.
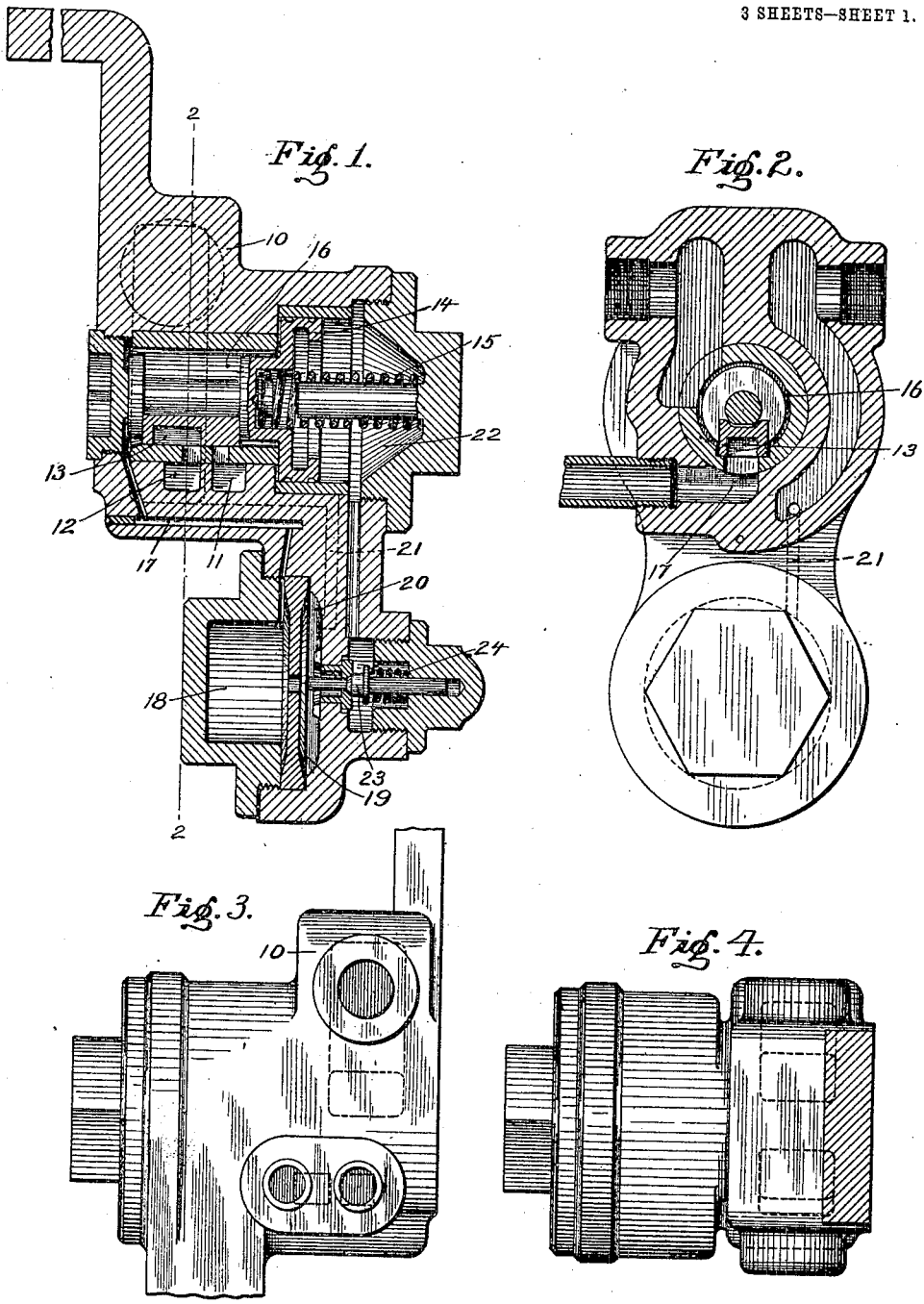
Witnesses:
Inventor,
Walter V. Turner
By Paul Synnestvedt
Attorney.

No. 838,287. PATENTED DEC. 11, 1906.
W. V. TURNER.
GRADUATED RELEASE VALVE.
APPLICATION FILED APR. 1, 1904.
3 SHEETS—SHEET 2.
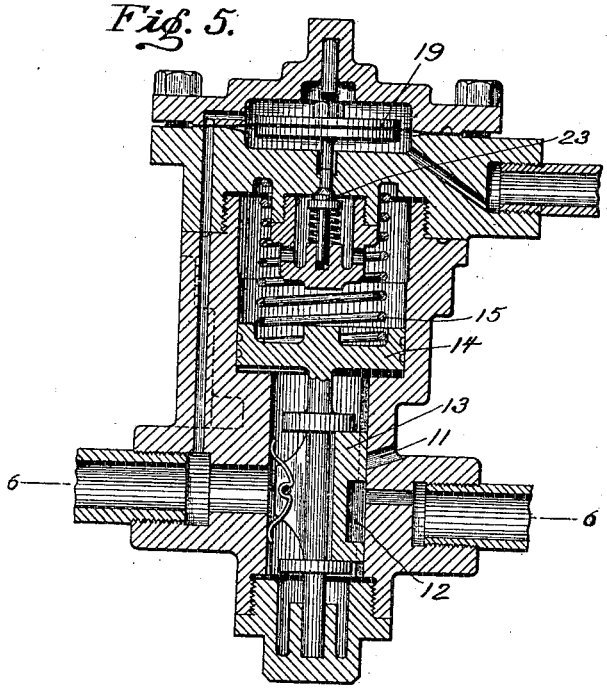
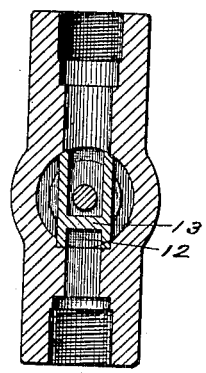
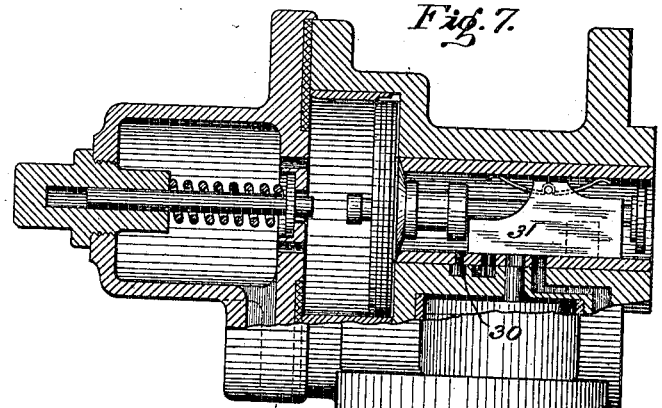
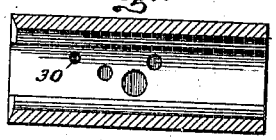
Witnesses:
Inventor;
Walter V. Turner
By Paul Synnestvedt.
Attorney.

No. 838,287. PATENTED DEC. 11, 1906.
W. V. TURNER.
GRADUATED RELEASE VALVE.
APPLICATION FILED APR. 1, 1904.
3 SHEETS—SHEET 3.
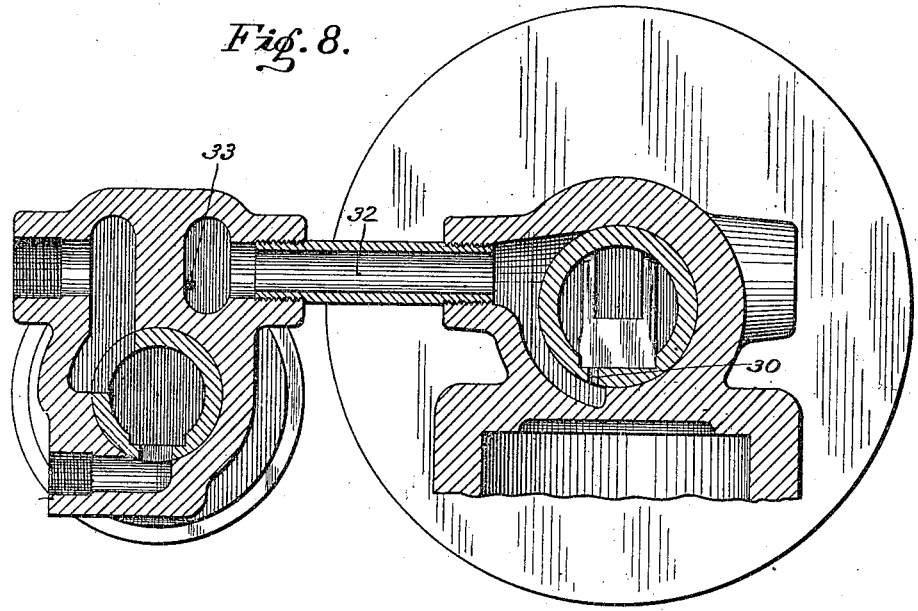
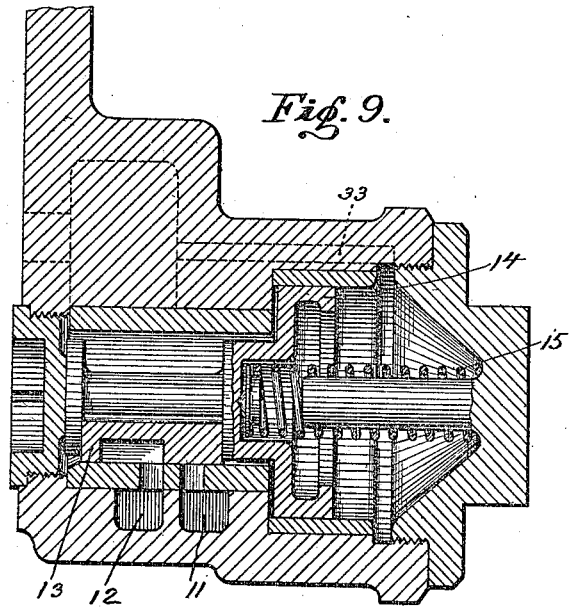

UNITED STATES PATENT OFFICE.

WALTER V. TURNER, OF WILKINSBURG, PENNSYLVANIA, ASSIGNOR TO WESTINGHOUSE AIR BRAKE COMPANY, OF WILMERDING, PENNSYLVANIA, A CORPORATION OF PENNSYLVANIA.

GRADUATED RELEASE-VALVE.

No. 838,287.   Specification of Letters Patent.   Patented Dec. 11, 1906.

Application filed April 1, 1904. Serial No. 201,168.

*To all whom it may concern:*

Be it known that I, WALTER V. TURNER, a citizen of the United States, residing at Wilkinsburg, in the county of Allegheny and State of Pennsylvania, have invented certain new and useful Improvements in Graduated Release-Valves, of which the following is a specification.

This invention has reference to improvements in air brake apparatus and particularly has for its object the provision of means for obtaining what is known as the graduated release action in a certain and effective manner.

A further object of this invention has reference to the provision of a graduated release valve in which there is comprised a valve for controlling the triple valve exhaust passage, a piston for actuating such valve, and a spring acting upon said piston in a direction to normally hold the triple valve exhaust passage closed, such spring being constructed to be aided by confined fluid pressure, the two acting in unison against the pressure in the train pipe to procure reciprocation of the triple exhaust controlling valve, the whole being combined with means whereby at each increase in train pipe pressure in effecting a release of the brakes the triple exhaust passage or the passage from which air escapes from the cylinder to the atmosphere will be open for a time and then automatically close so as to make it possible to secure the limited release action requisite in what is known as graduated release operation.

In order that my invention may be well understood I have illustrated the same not only in preferred form but also in somewhat modified structure in the accompanying drawings, wherein—

Figure 1 is a sectional view through a valve mechanism embodying my improvement adapted to be applied in conjunction with any of the ordinary or well known forms of triple valves;

Figure 2 is a sectional view taken on the line (2) of Figure 1;

Figure 3 is an end elevation of the same valve mechanism, and

Figure 4 another view partly in section showing the same structural arrangement as is given on Figures 1 to 3 inclusive;

Figure 5 is a sectional view showing substantially the like valve mechanism as Figures 1 to 4 but is somewhat different disposition of the parts in the valve casing;

Figure 6 is a detail view taken on the line (6) of Figure 5;

Figure 7 represents one of the well known forms of quick action triple valve, the same being shown partly in outline and partly in section to illustrate the application thereto of certain portions of my improvement;

Figure 7$^A$ is a sectional view indicating the arrangement of port openings in the seat of the triple valve shown in Figure 7;

Figure 8 is a sectional view showing certain of the details of the arrangement of my mechanism in which the triple valve forms a part of the combination; and Figure 9 is a sectional view of the apparatus which is designed to co-operate with the apparatus shown in Figures 7 and 8.

Referring now more particularly to Figures 1 to 4 it will be seen that in carrying out my improvement I provide first a casing numbered 10 within which there is a passage or opening 11 which leads to the atmosphere, and another opening or passage 12 which is intended to communicate with the triple valve exhaust port. The communication between the passages 11 and 12 is controlled by means of a slide valve 13, which in the position shown has cut off the flow of air between the said passages 11 and 12, the valve with its actuating piston 14 having been moved over by the operation of the spring 15. The chamber 16 at the left of the piston 14 is supplied with air from the train pipe and also communicates by a passage 17 with a chamber 18 on the left of a movable abutment or diaphragm 19 the chamber 20 to the right of which is in open communication with the auxiliary reservoir by means of the dotted passage 21 as shown.

The chamber 22 at the right of the piston 14 has communication with the chamber 20 when the valve 23 is opened by action of the diaphragm 19 but not otherwise, the valve 23 being provided with a spring 24 to aid in the seating thereof.

The operation of the mechanism just described is as follows:

Assuming the brakes to have been applied with the triple valve in application position as is usual after an application either whole or partial and it is desired to make a partial release of the same, a slight amount of increase pressure is supplied to the train pipe as is usual in an apparatus of this character, such pressure entering the chamber 16 of the slide valve 13 and also the chamber 18 to the left of the diaphragm 19 this having the effect of momentarily of pushing the piston 14 over the spring 15, the leakage past the piston 14 which is not a very tight fit or which may be provided if preferred with a small leakage port being allowed to flow past the valve 23 into the auxiliary reservoir through the passage 21 because of the temporary surplus of pressure in the chamber 18 acting on the diaphragm 19 to hold the valve 23 in open position. As soon however as the slight increase in train pipe pressure has, through the opening of the valve 23 and the leakage past the piston 14, been equalized with the pressure in the reservoir then the pressures on opposite side of 19 being alike the valve 23 will close and the pressure at the right of piston 14 will immediately accumulate until it equals that at the left of the piston and the spring 15 will thereupon move the slide valve over to the position shown cutting off the escape of further pressure from the brake cylinder by closing the communication between the passages 11 and 12. If it is desired to make a further partial release of the brakes a further slight increase in train pipe pressure is made and the operation just described is repeated. As already stated the arrangement of the parts shown in Figures 5 and 6 is substantially similar to that shown in Figures 1 to 4 except that for convenience in construction the two movable abutments, that is the piston and diaphragm, are made to operate along the same longitudinal axis and the parts are assembled in slightly different shapes. In operation however the structure of Figures 5 and 6 is exactly the same as is the operation of the structure shown in Figures 1 to 4 and I have there applied to the several parts the same reference numerals as are found in the preceding figures.

In constructing my improvement I have found that the place of the diaphragm and auxiliary reservoir controlling valve 23 can be supplied by the usual triple valve piston and main valve of the triple valve, and such an arrangement I have shown in Figures 7 to 9 inclusive. As is well known the main piston of the ordinary form of triple valve is balanced between train pipe and reservoir pressure and therefore in this respect corresponds to the diaphragm 19 of Figures 1 and 5, and as a substitute for the port openings controlled by the valve 23 I have, as indicated clearly in Figures 7 and 7^A, provided a small port in the seat of the triple valve which I have marked 30, which said port is arranged so that it will be uncovered by the main triple valve slide valve 31 when the latter is in full release position. The port 30 communicates with a passage (see Figure 8) 32 leading by means of another passage 33 to the chamber at the right of the piston 14 (see Figure 9) the piston 14 and its connected slide valve 13 with the other parts of the mechanism to which this specially belongs being substantially the same as is shown in Figures 1 and 5.

The operation of this last mentioned arrangement is as follows:

Assuming the brakes to have been applied if now it be desired to secure partial release a slight increase is made in train pipe pressure which moves the triple valve piston to the position shown in Figure 7 which opens the port 30 that communicates, as stated, with the passage 32 and thereby allows pressure which leaks past the piston 14 to enter the auxiliary reservoir and equalize the pressures between the reservoir and train pipe, after which the spring at the right of the piston 14 will move the slide valve 13 to the position shown in Figure 9 and cut off further escape of pressure from the brake cylinder. At each increase in train pipe pressure the like operation is repeated whereby the brakes are caused to release by stages or predetermined degree as required.

Having thus described my invention and illustrated its use, what I claim as new, and desire to secure by Letters Patent, is the following:

1. A graduated release mechanism for automatic air brakes comprising in combination with an auxiliary reservoir, cylinder and triple valve, a valve controlling the triple valve exhaust, a piston for actuating said exhaust controlling valve, means for holding said exhaust controlling valve closed against train pipe pressure, and mechanism whereby increases in train pipe pressure operate said exhaust controlling valve to open the same and permit a partial release of the brakes and whereby the said exhaust controlling valve is closed on equalization of pressure between the train pipe and reservoir, substantially as described.

2. The combination with a triple valve auxiliary reservoir and cylinder of an automatic air brake apparatus of a valve controlling the triple valve exhaust, a piston for actuating said valve, a spring acting on said piston to hold said exhaust controlling valve normally closed, and a valve controlling a passage from the auxiliary reservoir to the chamber in which said spring is housed, a movable abutment for actuating said last mentioned valve such abutment being exposed on one side to auxiliary reservoir pressure and on the other to train pipe pressure, said parts being combined to open the triple exhaust passage for predetermined time on increase in train pipe pressure and to automatically close such exhaust passage on equalization between train pipe and reservoir pressure, substantially as described.

3. A graduated release valve for automatic air brakes comprising in combination with the brake appliances and triple valve, a valve controlling the cylinder exhaust, a movable abutment for actuating said valve, a spring adapted to hold said valve and abutment in position to normally close said cylinder exhaust, said abutment being exposed on one side to train pipe pressure and on the other side to the auxiliary reservoir pressure in augmentation of said spring pressure, substantially as described.

4. A graduated release valve for automatic air brakes, comprising in combination, an auxiliary reservoir, a brake cylinder, a triple valve, and brake pipe, a valve controlling the exhaust from the triple valve separate from the triple release valve, a movable abutment for actuating said valve, a spring adapted to hold said exhaust controlling valve and abutment in position to normally close the escape of pressure from the cylinder, said abutments being controlled by train-pipe pressure on one side and auxiliary reservoir on the other, substantially as described.

5. In combination in automatic air brake mechanism, an auxiliary reservoir, a cylinder, a triple valve, and a graduated release valve independent of the triple valve connected to the triple valve exhaust and adapted to be controlled by variations in pressure in the train pipe.

In testimony whereof I have hereunder signed my name in the presence of the two subscribed witnesses.

WALTER V. TURNER.

Witnesses:
PAUL SYNNESTVEDT,
CHAS. H. EBERT.